United States Patent
Joly

(10) Patent No.: US 9,239,274 B2
(45) Date of Patent: Jan. 19, 2016

(54) EVALUATION OF THE RELIEF OF A TIRE SURFACE BY ACTIVE STEREOVISION

(75) Inventor: Alexandre Joly, Cournon d'Auvergne (FR)

(73) Assignees: Michelin Recherche et Technique S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1118 days.

(21) Appl. No.: 13/128,362

(22) PCT Filed: Nov. 3, 2009

(86) PCT No.: PCT/EP2009/064481
§ 371 (c)(1),
(2), (4) Date: Sep. 30, 2011

(87) PCT Pub. No.: WO2010/052196
PCT Pub. Date: May 14, 2010

(65) Prior Publication Data
US 2012/0007956 A1    Jan. 12, 2012

(30) Foreign Application Priority Data
Nov. 7, 2008   (FR) ..................... 08 57564

(51) Int. Cl.
*G01M 17/02*   (2006.01)
(52) U.S. Cl.
CPC ................... *G01M 17/027* (2013.01)
(58) Field of Classification Search
CPC ... G01M 17/027; G01B 11/24; G01N 21/952; G03B 15/03; G03B 33/12; G03B 35/08; G06T 2207/30164; G06T 7/0028; B29D 2030/0634; H04N 13/0221; H04N 13/0242

USPC ........ 382/141, 154; 348/42, 47, 92, 135, 136, 348/148
See application file for complete search history.

(56) References Cited

U.S. PATENT DOCUMENTS

| 4,175,862 | A | 11/1979 | DiMatteo et al. |
| 4,653,104 | A | 3/1987 | Tamura |

(Continued)

FOREIGN PATENT DOCUMENTS

| JP | 62-032406 | 7/1987 |
| JP | 63-024116 | 2/1988 |
| JP | 09-021620 | 1/1997 |
| JP | 2001-249012 | 9/2001 |
| JP | 2003-240521 | 8/2003 |
| JP | 2007-085836 | 4/2007 |

OTHER PUBLICATIONS

Schwartz et al. "Drug Release from Wax Matrices I, Analysis of Data with First-Order Kinetics and with the Diffusion-Controlled Model", Journal of Pharmaceutical Sciences, vol. 57, No. 2, pp. 274-277, Feb. 1968.

(Continued)

*Primary Examiner* — Sath V Perungavoor
*Assistant Examiner* — Nathnael Aynalem
(74) *Attorney, Agent, or Firm* — Cozen O'Connor

(57) ABSTRACT

Acquisition device for taking a digital relief image of the surface of a tire having two color cameras for the acquisition of stereoscopic images. Each camera has N primary image sensors in a given primary color (R, G, B), where N is equal to or greater than two. Each camera is placed so as to acquire the light emitted (E) towards a predetermined area (Z) of the surface of the tire by N lights and reflected (F) by the surface of the tire. The N lights simultaneously project each independently and along the same direction onto the predetermined area of the surface of the tire. The projected light has a wavelength that corresponds to one of the primary colors of the cameras, according to a fringe system $(S_1, S_2, \ldots S_N)$ consisting of an alternation of illuminated and non-illuminated bands of given width $(L_1, L_2, \ldots L_N)$.

10 Claims, 4 Drawing Sheets

(56) References Cited

U.S. PATENT DOCUMENTS

| | | | |
|---|---|---|---|
| 5,561,526 A * | 10/1996 | Huber et al. | 356/604 |
| 6,064,478 A * | 5/2000 | Paul et al. | 356/237.1 |
| 6,750,873 B1 | 6/2004 | Bernardini et al. | |
| 7,092,105 B2 * | 8/2006 | Lim et al. | 356/601 |
| 2001/0024279 A1 | 9/2001 | Kaneko et al. | |
| 2003/0042401 A1 | 3/2003 | Gartner et al. | |
| 2004/0105580 A1 | 6/2004 | Hager et al. | |
| 2005/0058333 A1 | 3/2005 | Kaneko et al. | |
| 2005/0063581 A1 * | 3/2005 | Viala et al. | 382/154 |
| 2005/0088529 A1 | 4/2005 | Geng | |
| 2007/0204684 A1 * | 9/2007 | Muhlhoff et al. | 73/146 |
| 2007/0209431 A1 * | 9/2007 | Fujisawa et al. | 73/146 |

OTHER PUBLICATIONS

Rusinkiewicz et al. "Real-time 3D Model Acquisition", Proceedings of SIGGRAPH 2002, vol. 21, 9 pages, Jul. 2002.

P. Jiahui et al., "Color-coded digital fringe projection technique for high-speed 3-D shape measurement: color coupling and imbalance compensation", SPIE, No. 5265, pp. 205-212, 2004, XP040253026.

A. Lathuiliere et al., "Colour 3D system characterization", IEEE Industrial Electronics, IECON 2006—$32^{nd}$ Annual Conference, pp. 3232-3237, XP031076932, Nov. 1, 2006.

T. Sakaguchi et al., "3-CCD Video Camera System for Consumer Use", International Conference on Consumer Electronics—Digest of Technical Papers, vol. Conf. 14, pp. 120/121, Jun. 1995.

* cited by examiner

EVALUATION OF THE RELIEF OF A TIRE SURFACE BY ACTIVE STEREOVISION

RELATED APPLICATION

This is a U.S. National Phase Application under 35 USC 371 of International Application PCT/EP2009/064481, filed on Nov. 3, 2009.

This application claims the priority of French patent application no. 08/57564 filed Nov. 7, 2008, the entire content of which is hereby incorporated by reference.

FIELD OF THE INVENTION

The invention relates to the field of visual tire inspection.

BACKGROUND OF THE INVENTION

Conventionally, such inspections require the skill of an operator, who visually inspects the tire in order to detect possible defects visible on the surface of the latter. These operations are lengthy and expensive, and this is why manufacturers actively seek means for assisting the operator.

In this context, it proves necessary to acquire a digital representation of the relief of the surface of the tire to be inspected for the purpose, after analysis and processing, of comparing this digital representation with a reference image of the surface or with data coming from a model. This digital representation of the surface is also called the relief image of the surface.

More particularly, the invention relates to the field of the stereoscopic acquisition of a relief image of the surface.

Various image acquisition methods have been disclosed for the purpose of supplying data as relevant as possible to a digital processing means capable of comparing this image with a reference image so as to determine the conformity of the tire being analysed.

Using the technique of classical stereovision, it has been proposed to use two separate cameras dedicated respectively to the acquisition of data relating to the relief and to the acquisition of data relating to the appearance, such as the colour, greyscale or brightness.

This solution, called a passive stereoscopic solution, requires the images coming from the two acquisition means to be brought into correspondence. The correspondences may be determined using characteristic elements of the image, such as the presence of characteristic corners or contours. The coordinates of the surface are then calculated by triangulation by determining the angles of different views of the same point on the surface seen by the two cameras.

However, several assumptions are necessary in order for the calculation algorithms to be executed appropriately. This is because ambiguities may arise when the surface to be evaluated has areas of light reflection or refraction. In this case, the algorithms cannot correctly determine the correspondences between the pixels of the two cameras. In addition, unlike the human brain, they have no knowledge of the topography or context of the image to be analysed. It may therefore be necessary to involve an operator in the analysis process in order to select the points to be brought into correspondence.

Thus, in contrast to passive optical techniques, acquisition techniques referred to as active techniques have been developed that consist in sending an optical signal onto the surface to be reconstructed seen by cameras at different angles in order to make it easier to bring the points of the surface into correspondence.

These methods consist in illuminating the surface using known luminous features, which are sensed by the optical receivers of the cameras. The operation of bringing the images recorded by the two stereoscopic cameras into correspondence is facilitated by knowing the elements of the feature, and the abovementioned ambiguities are therefore resolved during the analysis.

As will be explained in greater detail later, one of the structured light projection algorithms most commonly used consists in illuminating the surface using light formed from a series of binary features made up of bands, comprising an alternation of illuminated lines and non-illuminated lines. At the same time, the cameras acquire these series of successive images in which each of the points on the surface may be illuminated or non-illuminated. It is then possible to reconstruct the alternation of illuminated and non-illuminated bands seen by the two cameras, to identify the light bands in a one-to-one manner in order to locate a point on the surface with certainty and to bring the images from the two cameras into correspondence so as to reconstruct the relief image of the surface.

Using these illumination algorithms judiciously, it is thus possible to acquire the image of the surface of a tire while avoiding the effects due to shadow areas when the relief of the surface is greatly cut-up, but also to provide sufficient information for an image processing means to distinguish the brightness effects due to stains or colour variations.

Application of the abovementioned methods to evaluating the relief of the surface of a tire may involve several adaptations when it is desired to optimize the image acquisition cycle, in particular when it is desired to define the relief of the tread.

FIG. 1 illustrates the case of a conventional application in which an illumination means 20 projects a fringe system onto the tread and in which stereoscopic cameras 10a and 10b are placed so as to acquire the light emitted (E) by the illumination means 20 and reflected (F) by the surface of the tire P. The tire is fitted onto the rim 30 of a wheel 31 rotated about the axis D by a motor-driven support hub 32.

At each acquisition pass, the cameras record the two stereoscopic images of an angular portion a of the surface of the tread. The complete image of the tread is obtained by making the tire rotate through one complete revolution about its axis of revolution D and butting together the $2\pi/\alpha$ pictures taken by each of the stereoscopic cameras.

Implementation of the algorithm also requires fringe systems S of the type of those illustrated in FIGS. 2, 3 and 3a to be projected in succession one after another. The fringe systems comprise an alternation of illuminated and non-illuminated bands of known widths according to a binary code determined in advance (S1, S2, S3, S4) and are associated with encoding and decoding techniques enabling the fringes of the projected images, recorded by the cameras, to be identified.

The stereoscopic cameras acquire the images of the projection of each of the fringe systems S1, S2, S3 and then S4 in succession onto the surface of the tire.

Referring to FIGS. 3a and 3b, the fringe system S1 corresponds to the first row. The fringe system S2 corresponds to row 2, the fringe system S3 corresponds to row 3 and the fringe system S4 corresponds to row 4. The number of fringe systems that can be projected is of course not limiting.

A processing system, involving known algorithms (these not forming part of the present description), decodes the images in order to associate with each point on the surface of the tire the successive illumination levels so as to resolve any positioning uncertainties.

A first method therefore consists in projecting each of the fringe systems in succession onto a portion of the tire and then in repeating this operation on the successive angular sectors by rotating the tire about its axis. A second method consists in taking, for each fringe system, images over a complete revolution of the tire and in making as many revolutions as there are fringe systems to be projected.

Whatever the method chosen, it has been found that these successive revolutions take up a considerable amount of time and reduce the efficiency of the inspection system. Such solutions also require particularly precise coding and synchronization means.

To reduce the acquisition time it is then possible, as proposed in the publication U.S. Pat. No. 4,175,862, to place as many fringe projection devices, associated with stereoscopic image means for the acquisition of the digital relief image of the surface of a tire, as the number N of fringe systems to be projected.

In this way, it is possible to acquire the 2N images of the complete surface of a tire illuminated by the N fringe systems, coming from the 2N stereoscopic cameras, by making the tire undergo a single revolution about its axis of revolution.

However, such a device requires a large number of cameras and projectors, which may interfere with one another and may have in addition the drawback of entailing many additional calculations in order to bring the N relief images of the surface into registration one with respect to another.

SUMMARY OF THE INVENTION

The acquisition device for taking a digital relief image of the surface of a tire according to an embodiment of the invention comprises:

two colour cameras for the acquisition of stereoscopic images, each camera comprising N primary image sensors in a given primary colour, N being equal to or greater than two, and placed so as to acquire the light emitted towards a predetermined area of the surface of the tire by illumination means and reflected by the surface of said tire; and N illumination means simultaneously projecting, each independently and along the same direction onto said area of the surface of the tire, light having a wavelength that corresponds to one of the primary colours of the cameras, according to a fringe system consisting of an alternation of illuminated and non-illuminated bands of given width.

For the same angular sector, each of the cameras takes a picture of the set of fringe systems simultaneously, and it is of little importance, as will be seen later, that a given point on the surface of the tire is considered as being illuminated in one fringe system and not illuminated in another.

Therefore, in a single revolution of the tire about its axis, N pairs of images of the circumferential surface of the portion of the tire that it is desired to analyse are obtained, each pair coming from the two sensors in a given colour that are located in each of the colour cameras. These N pairs of images form the N stereoscopic images of the N fringe systems.

The invention also has the advantage of reducing the number of image registration and camera calibration operations because the pictures are taken simultaneously. Likewise, this acquisition mode gets round the problem of any light interference coming from the illumination means.

DETAILED DESCRIPTION OF THE DRAWINGS

Figure 1:
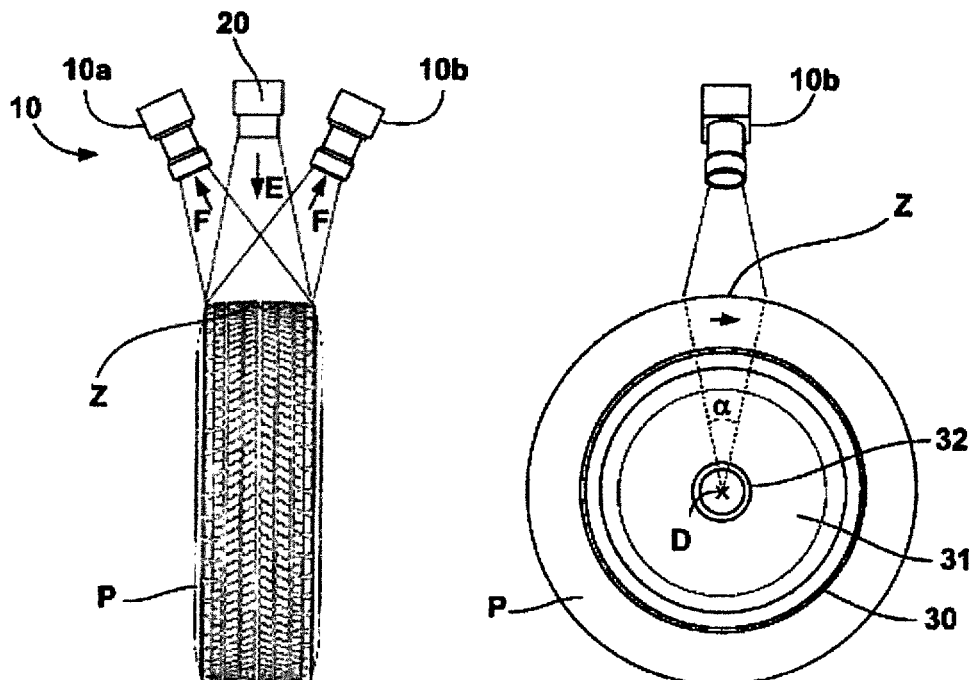
FIG. 1 shows a schematic view of a conventional stereoscopic viewing device.

As explained above, the device illustrated in FIG. 1 shows schematically a means 10 for the acquisition of a stereoscopic image formed from two cameras 10a and 10b each equipped with an entry objective through which enters the reflected light F coming from a predetermined area Z of the surface of the tire P to be examined, in this case the tread. Said surface is illuminated by an illumination means 20 capable of projecting one or more fringe systems comprising an alternation of illuminated bands and non-illuminated bands onto the surface of the tire seen by the objectives of the cameras.

Figure 2:
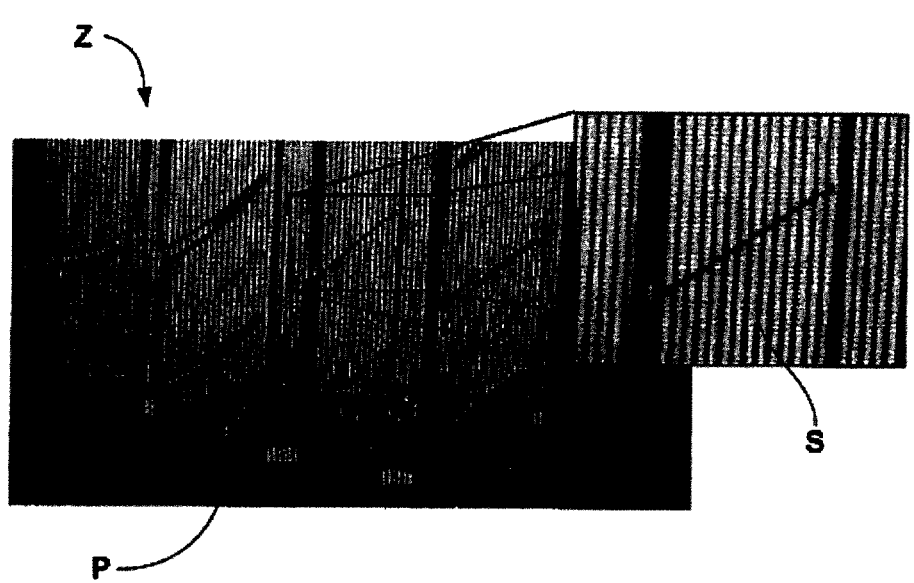
FIG. 2 shows a photographic view of the surface of a tread illuminated using a fringe system.

FIG. 2 is a photographic view of said area Z of the tread of a tire P illuminated by a fringe system. The light lines are mutually parallel and preferably placed in the circumferential direction.

In the context of implementing the invention, it is also conceivable for the lines making up the fringe system to be placed in the transverse direction, in the radial direction, or to form systems of concentric circular lines, in particular when the surface of the sidewall of a tire is to be analysed.

Figure 3A:
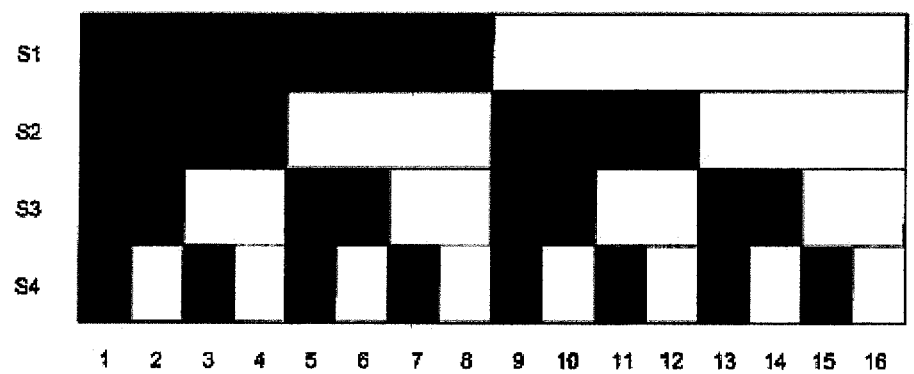
FIG. 3a shows fringe systems structured according to a binary code.
Figure 3B:
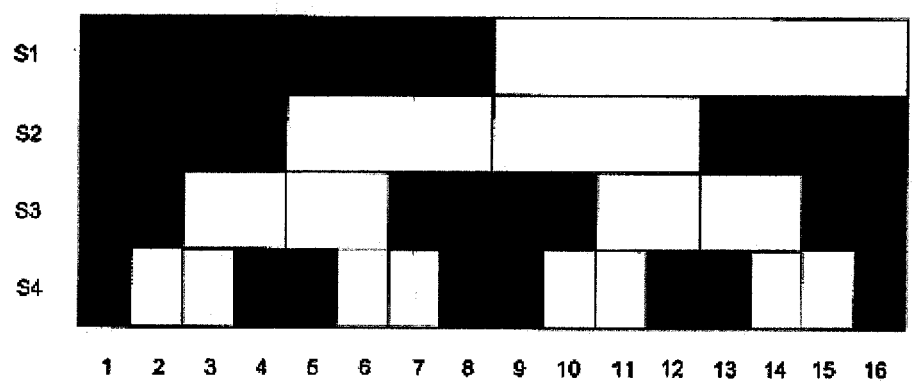
FIG. 3b shows fringe systems structured according to a Gray code.

FIGS. 3a and 3b illustrate the case of fringe systems in which the width of the bands of the fringe system is inversely proportional to the number of bands. Thus, the width of the bands of the fringe system S2 is equal to one half of the width of the bands of the fringe system S1, the width of the bands of the fringe system S3 is equal to one half of the width of the bands of the fringe system S2, and so on. In other words, the widths ($L_1$, $L_2$, . . . $L_N$) of the bands of each of the fringe systems ($S_1$, $S_2$, . . . $S_N$) are multiples, modulo $2^n$, of the width of the bands of the fringe system having the smallest band width ($L_4$), n varying from 1 to (N−1), N being equal to 4 in the example shown in FIGS. 3a and 3b.

Thus, the higher the number N of the rank of the fringe system the smaller the width of the bands and the higher the analysis precision, but the longer the acquisition time and the longer the calculation time. In addition, the width of the fringes is limited by the resolution of the camera sensors.

It may sometimes prove difficult to determine whether a pixel observed by the cameras is illuminated or not, because of inter-reflections between the surface to be examined and its environment. In addition, the binary encoding suffers from the accumulation of errors at the boundaries of the light bands. Specifically it may be observed that, in a binary code as illustrated in FIG. 3a, the boundary between lines 8 and 9 is present in all the fringe systems.

FIG. 3b shows a particular code proposed by Gray (Bell Laboratories, 1953), described for information by Hall-Holt and Rusinkiewicz at the international conference on computer imaging in 2001, or in the article published by Rusinkiewicz, Hall-Holt and Levoy "Real-time 3D model acquisition", Proceedings of SIGGRAPH 2002, Volume 21, pages 438-446 in July 2002. This particular code consists in illuminating the surface using systems of light fringes, the width of the fringes also being reduced by a factor of two at each successive image but in which each boundary between two bands appears only once. This device explains how the analysis errors likely to occur in the boundary regions can be reduced.

Other codes and other reconstruction algorithms have been proposed in order to increase acquisition and analysis reliability, such as the code proposed by Hall-Holt and Rusinkiewicz, but it is not in the spirit of the present description to explain the use of these various means for creating structured images, rather to state that they essentially consist in illuminating the surface to be evaluated using fringe systems consisting of an alternation of illuminated bands and non-illuminated bands according to a given code.

To make best use of the results, the fringe systems projected by each of the illumination means are arranged so as to be superposed in such a way that the boundary regions are aligned.

Figure 4:
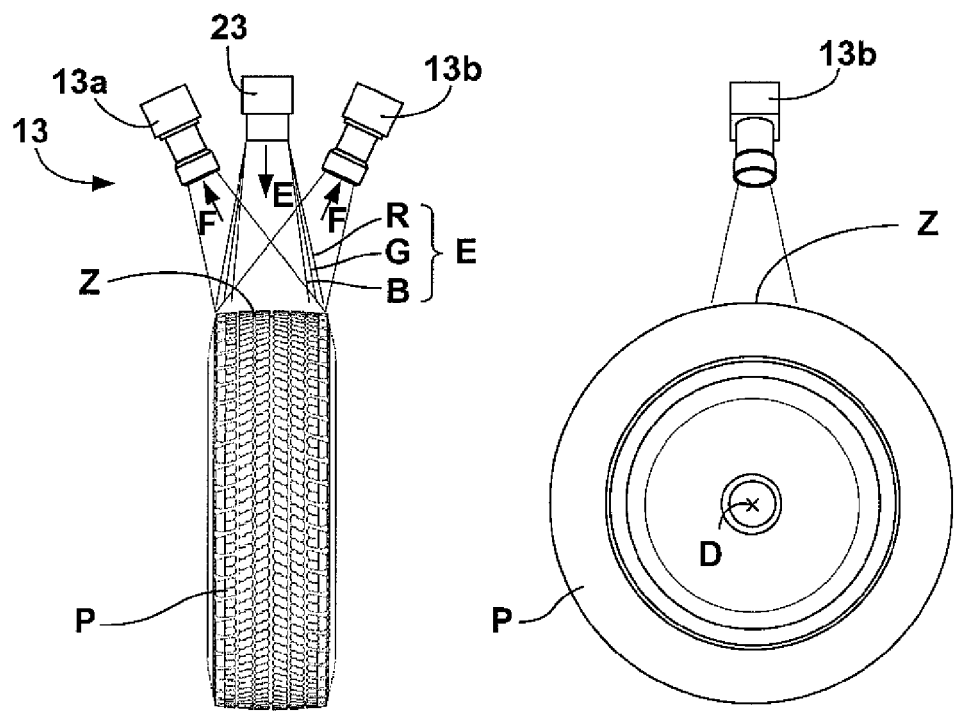
FIG. 4 shows a schematic view of the device according to an embodiment of the invention.
Figure 5:
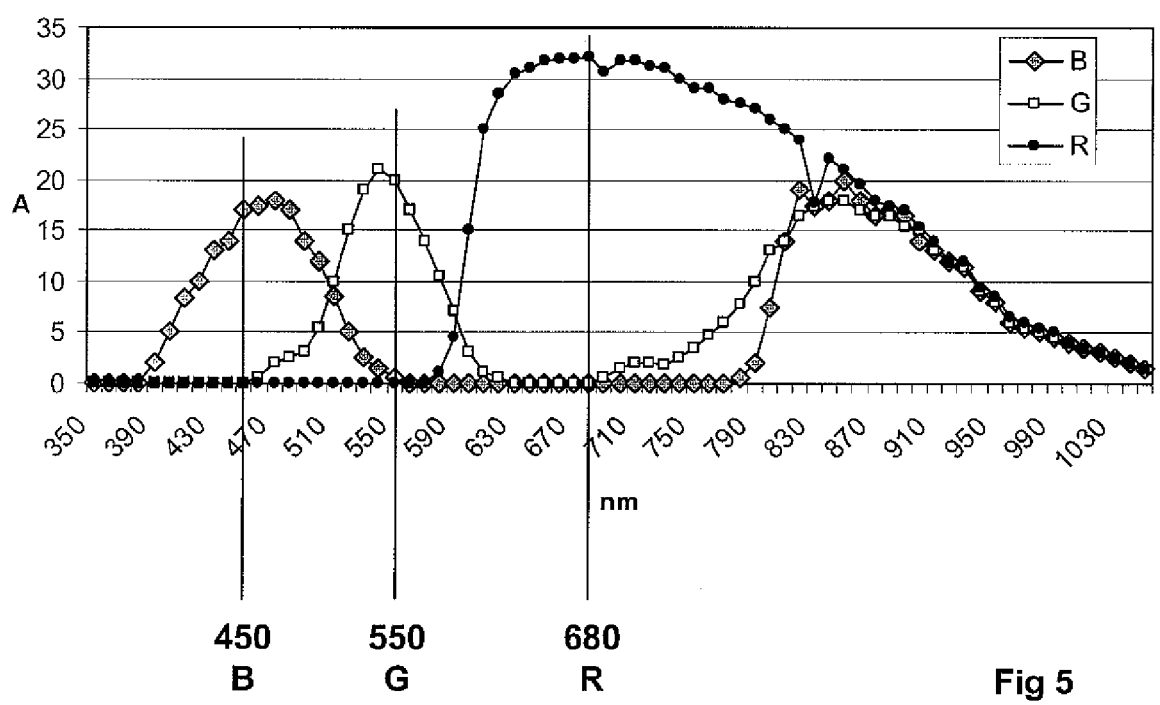
FIG. 5 shows an example of wavelength distribution spectra for the primary colours used in a colour camera.
Figure 6:
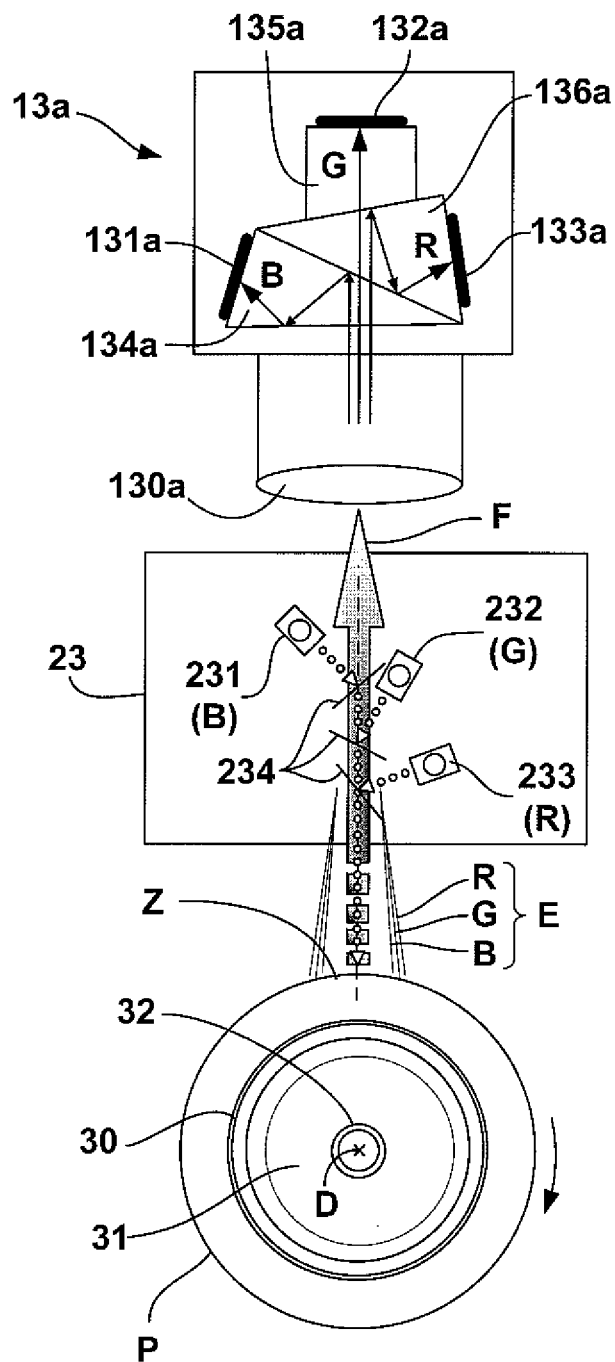
FIG. 6 shows a schematic view indicating the principle of a colour camera used in a stereoscopic image acquisition means according to an embodiment of the invention.

The device according to an embodiment of the invention is illustrated in FIGS. 4, 5 and 6.

In the case of this acquisition device, it is considered that the number of fringe systems to be projected in order to obtain sufficient precision is small. In practice, it is considered that the projection of three or four fringe systems is sufficient and the objective of the invention is to take advantage of this situation.

The device according to an embodiment of the invention comprises a stereoscopic image acquisition means formed by two colour cameras 13a and 13b.

In currently employed technologies, this type of camera contains means capable of splitting the reflected light coming from the object, the image of which it is desired to acquire, into a certain number of base colours (R, G, B).

These splitting means may be formed by sets of prisms or else by a filter consisting of colour cells of the primary colours, better known as a Bayer filter. The function of these means is to split the light into a certain number of colours called base or fundamental colours. As a general rule, such a filter splits the light into the three base or fundamental colours, namely red (R), green (G) and blue (B). However, it is also possible to produce cameras comprising more than three fundamental colours. As an example, cameras comprising four base colours, namely red (R), green (G), blue (B) and cyan, are available on the market.

The reflected light F coming from the object to be examined is therefore decomposed into as many monochromatic images as there are base or fundamental colours. Each of these images is then directed onto a specific sensor, formed by an assembly of light-sensitive photosites such as CCD or CMOS sensors capable of converting the amount of light that they receive into an electrical current. Therefore, as many greyscale images as there are base colours are obtained. The maximum resolution of a sensor depends on the number of photosites to which the number of pixels forming the final image corresponds.

The invention takes advantage of this mode of operation of the colour cameras in order to obtain particular information regarding the relief image of the surface to be evaluated.

For this purpose, and with reference to FIG. 4, the N stereoscopic image acquisition means intended for acquiring the 2N images of the surface of the tire that are illuminated by the N fringe systems are formed by the 2N primary image sensors of the two colour cameras 13a and 13b, the two sensors in the same given primary colour of each of the cameras forming a stereoscopic image acquisition means.

It is then sufficient for each of the illumination means to illuminate the surface according to a given fringe system with light having a wavelength that corresponds to one of the primary colours of the cameras in order for the N fringe systems to be able to be seen simultaneously and separately by the primary colour sensors of the two cameras.

The maximum number N of fringe systems that it will then be possible to project onto the surface corresponds to the number N of primary colours of the cameras.

FIG. 6 illustrates the operation of one of the colour cameras (13a) forming the stereoscopic image acquisition means. The operating details of the associated colour camera 13b, in which the suffix a can be replaced with the suffix b, are identical and are therefore not shown in the figures.

The light rays of the incident light F penetrate the camera and illuminate reflecting prisms, 134a (134b), 135a (135b) and 136a (136b) respectively, which split the light into the base colours and reflect the light so as to direct this light onto brightness sensors placed in the camera, namely 131a (131b), 132a (132b), 133a (133b) respectively, which are capable of forming images of the surface.

These colours are the base colours as shown in FIG. 5, in which the colour blue (B) corresponds substantially to a wavelength of 450 nm, the colour green (G) corresponds to a wavelength of 550 nm and the colour red (R) corresponds to a wavelength of 680 nm.

It is therefore sufficient to arrange for the illumination means (231) to emit a first fringe system S1 at the wavelength of 450 nm corresponding to blue and comprising an alternation of bands illuminated in blue light and non-illuminated bands in order for this fringe system to be seen by the sensor 131a (131b) assigned to this colour. A second fringe system S2, different from the first, is emitted simultaneously by the illumination system (232) at a wavelength of 550 nm and will therefore be seen only by the sensor 132a (132b) dedicated to the colour green. This fringe system consists of an alternation of bands illuminated with green light and non-illuminated bands. A third fringe system S3 emitted by the illumination system (233) at a wavelength of 680 nm will be seen by the sensor 133a (133b) reserved for red light and will comprise an alternation of red bands and non-illuminated bands.

Thus, with only two colour cameras, and by collecting the images coming from the three sensors of each of the colour cameras separately, it is possible to obtain the stereoscopic images of three different fringe systems S1, S2 and S3 emitted simultaneously by the illumination means according to different wavelengths corresponding to the base colours of the cameras.

The blue primary colour sensor 131a of the camera 13a is associated with the blue primary colour sensor 131b (not shown) of the camera 13b. These two sensors form an acquisition means for taking a stereoscopic image of the surface of the tire illuminated by the fringe system S1 emitted by the illumination means 231 corresponding to blue. The green primary colour sensor 132a of the camera 13a is associated with the green primary colour sensor 132b (not shown) of the camera 13b. These two sensors form an acquisition means for taking a stereoscopic image of the surface of the tire illuminated by the fringe system S2 emitted by the illumination means 232 corresponding to green. Finally, the red primary colour sensor 133a of the camera 13a is associated with the red primary colour sensor 133b (not shown) of the camera 13b. These two sensors form an acquisition means for taking a stereoscopic image of the surface of the tire illuminated by the fringe system S3 emitted by the illumination means 233 corresponding to red.

The two colour cameras 13a and 13b therefore see the three fringe systems simultaneously and the acquisition of the image of the complete surface of the tread illuminated by the three fringe systems may be produced in a single revolution of the tire about its axis of revolution D.

A given point on the surface of the tire may be illuminated simultaneously by two different colours, for example blue and green, and this point will be considered as illuminated in the fringe systems S1 and S2 and as non-illuminated in the fringe system S3.

To avoid distortions due to the projection of light onto the surface of the tire at different angles, the illumination means 23 is formed from three illumination means 231, 232 and 233 each capable of illuminating the surface of the tire according to a given fringe system and at a given wavelength. Thus, the means 231 emits the first fringe system S1 at the wavelength corresponding to blue (B), the means 232 emits a second fringe system S2 at the wavelength corresponding to green (G) and the means 233 emits a third fringe system S3 at the wavelength corresponding to red (R). These three fringe systems are emitted simultaneously and directed onto the surface of the tire at the same given angle using semi-reflecting mirrors 234.

So as to limit the parasitic effects due to wavelengths corresponding to the near infrared, it proves advantageous to place a filter on the objective of the camera capable of limiting entry of light rays with a wavelength greater than 750 nm. Other band-pass filters may also be added, so as to prevent the entry of light of undesirable wavelengths. Thus, more generally, the aim will be to filter the passage of light rays having a wavelength different from those used for the chosen illuminations.

For implementing a stereoscopic image acquisition device according to the invention as described above, it may prove advantageous to make (N+1) additional acquisitions of the image of the surface of the tire to be evaluated in order to determine, in an automatic manner, the calibration thresholds for distinguishing the illuminated bands from the non-illuminated bands. For this purpose, N images are formed by illuminating in succession, using each of the illumination means corresponding to each of the base colours, the entire surface of the tire, and suppressing the fringes, and one additional image in which all illumination is suppressed.

The invention claimed is:

1. An acquisition device for taking a digital relief image of the surface of a tire, comprising:
    two colour cameras configured to acquire stereoscopic images, each camera comprising N primary image sensors, each of the N primary image sensors detecting light of only one primary colour, N being equal to or greater than two, the two colour cameras being placed so as to acquire a light emitted towards a predetermined area of the surface of the tire by N illumination means and reflected by the surface of said tire; and
    N illumination means simultaneously projecting, each independently and along the same direction onto said area of the surface of the tire, each of the N illumination means emitting a light having a wavelength that corresponds to only one of the primary colours of the cameras, the N illumination means in combination emitting light in all of the primary colours detected by the N primary image sensors, each of the N illumination means projecting according to a fringe system including an alternation of illuminated and non-illuminated bands of given width, resulting in the simultaneous and independent projection of N fringe systems.

2. The acquisition device according to claim 1, wherein the fringe systems emitted by said illumination means have overlapping boundaries.

3. The acquisition device according to claim 2, wherein a respective width of each band of each fringe system is a multiple, modulo $2^n$, of the width of the bands of a fringe system having the smallest band width, n varying from 1 to (N−1).

4. The acquisition device according to claim 1, further comprising a means for retention of the tire and a means for rotating said tire with respect to the stereoscopic cameras and to the illumination means.

5. The acquisition device according to claim 1, further comprising a digital processor wherein execution of a program by the digital processor configures the digital processor to analyse the 2N images of the surface of the tire and determine the numerical relief of said surface.

6. The acquisition device according to claim 1, wherein each of the colour cameras comprises means for splitting the incoming beams into each of the N primary colours so as to direct the light beam onto as many sensors capable of defining a primary greyscale image of the surface of the tire.

7. The acquisition device according to claim 1, wherein the primary colours are red, green and blue.

8. The acquisition device according to claim 1, wherein the primary colours are red, green, blue and cyan.

9. A method of taking a digital relief image of the surface of a tire using a device according to claim 1, the method comprising:
    acquiring 2N images of said illuminated surface according to the N fringe systems emitted by the N illumination means; and
    revolving the tire once completely around its axis of revolution, wherein the 2N images corresponding to each of the sensors are acquired simultaneously while the tire makes one complete revolution.

10. The method according to claim 9, further comprising:
    acquiring an additional image of the area of the surface of the tire with the N illumination means not illuminated; and
    calibrating the detection thresholds of each of the primary image sensors based on all of the images acquired.

* * * * *